(12) United States Patent
Trautmann

(10) Patent No.: US 6,260,582 B1
(45) Date of Patent: Jul. 17, 2001

(54) MOTOR-DRIVEN UNIT

(75) Inventor: Frank Trautmann, Königstein (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 09/403,116

(22) PCT Filed: Apr. 2, 1998

(86) PCT No.: PCT/EP98/01905

§ 371 Date: Mar. 6, 2000

§ 102(e) Date: Mar. 6, 2000

(87) PCT Pub. No.: WO98/47748

PCT Pub. Date: Oct. 29, 1998

(30) Foreign Application Priority Data

Apr. 18, 1997 (DE) .............................. 197 16 187

(51) Int. Cl.⁷ ................................. F16K 11/10
(52) U.S. Cl. ....................... 137/884; 303/119.3
(58) Field of Search ................. 137/884; 303/119.3

(56) References Cited

U.S. PATENT DOCUMENTS

| 4,303,097 | 12/1981 | Zerby . |
| 5,449,226 | 9/1995 | Fujita et al. . |
| 5,865,511 | * 2/1999 | Hinz et al. .................. 303/119.2 |

FOREIGN PATENT DOCUMENTS

| 19 41 368 | 6/1964 | (DE) . |
| 78 16 556 | 9/1978 | (DE) . |
| 34 27 906 | 1/1986 | (DE) . |
| 39 15 732 | 11/1989 | (DE) . |
| 39 35 946 | 5/1990 | (DE) . |
| 41 33 879 | 4/1993 | (DE) . |
| 42 22 248 | 1/1994 | (DE) . |
| 44 44 383 | 6/1996 | (DE) . |
| 0 364 816 | 4/1990 | (EP) . |
| 0 584 682 | 3/1994 | (EP) . |
| 20 89 993 | 1/1972 | (FR) . |
| 07 047945 | 2/1995 | (JP) . |

OTHER PUBLICATIONS

Search Report of the German Patent Office for Application No. 197 16 187.1.
Jende, Siegfried et al., VDI–Z, Warum Dehnschaftschrauben?, vol. 128, Issue 12, 1986, p. 111–114, 117–119.
Bossard Handbuch der Verschruabungstechnik, expert publisher, 1982, pp. 241–254.

* cited by examiner

Primary Examiner—John Fox
(74) Attorney, Agent, or Firm—Rader, Fishman & Grauer PLLC

(57) ABSTRACT

The present invention relates to a motor-driven unit for an automotive vehicle brake system comprising a housing body for magnetic valves and a cover located on one side, especially for electrical structural elements used to control the magnetic valves. An attachment means is interposed between the cover and the motor housing in such a manner that the latter structural elements can be attached to the housing body with the same contact force. These features permit rendering the sealing effect more uniform in the area of the electronic unit and in the area of the motor housing. In addition, the result of the arrangement of the attachment means is material economy and a reduced assembly effort.

9 Claims, 1 Drawing Sheet

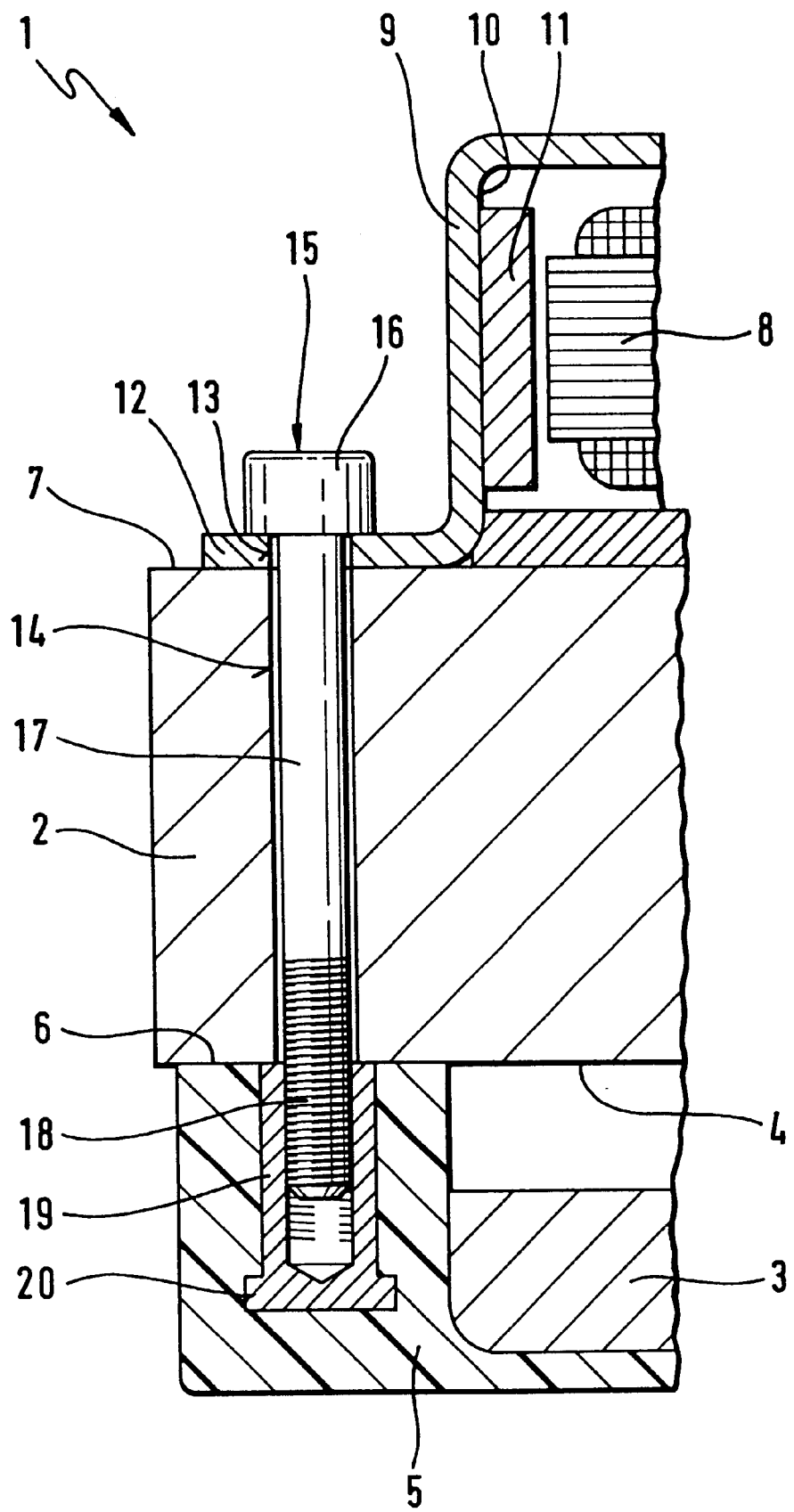

MOTOR-DRIVEN UNIT

TECHNICAL FIELD

The present invention relates to vehicle brake systems and more particularly relates to a motor-driven unit for an automotive vehicle brake system.

BACKGROUND OF THE INVENTION

Motor driven pump units are typically used in ABS and traction control systems. Cap screws which are acted upon by a defined preloading force in the assembly of the unit are used to attach the cover to the housing body. It has been found that the attachment screws suffer from a more or less great loss in preloading force in the course of time. Because several attachment screws are required, it is unavoidable that there are differences in the preloading force and in the loss in preloading force among individual screws. The result of this state of affairs is an uneven contact force of the cover on the housing body and, consequently, an uneven sealing effect. The disadvantages of the uneven sealing effect occur in a similar fashion when attaching a motor housing to another side of the housing body.

Therefore, an object of the present invention is to provide a unit with structural elements which can be attached to one another with an improved and, more particularly, more even sealing effect. Another objective of the present invention is a simplification and cost reduction of the assembly process.

These objects are achieved by the present invention wherein a motor housing is arranged on another side, and there is provision of at least one attachment means between the motor housing and the cover in such a fashion that the latter components can be attached to the housing body with the same contact force. Because the two structural elements, i.e., motor housing and cover, are urged on the housing body with the same contact force, a homogeneous sealing effect without major differences between the one or the other side may be achieved. In addition, the arrangement of the present invention leads to a reduction in the necessary attachment means because each attachment means fixes both the motor housing and the cover in position.

In a preferred embodiment, no attachment means project from the external edge of the housing body. The result is a closed contour with smooth surfaces where the necessary attachment means are arranged in a space-saving manner.

According to a preferred aspect of the present invention, reduced-shaft bolts are provided as attachment means which suffer from a particularly small loss in preloading force in the course of time.

According to another preferred aspect of the present invention, the cover is made of plastics and has an injection-molded bushing for engagement by the attachment means. These features facilitate the assembly because there is no need for a separate fitting of covers and fastening nuts from different sides. Thus, the bushing and the cover constitute a construction unit which can be handled independently.

BRIEF DESCRIPTION OF THE DRAWINGS

The sole FIGURE is a side view of a schematic cross-section taken through a motor-driven unit according to the present invention.

DETAILED DESCRIPTION OF THE PREFERRED EMBODIMENTS

A motor-driven unit 1 for the braking pressure modulation in an automotive vehicle brake system comprises a housing body 2 with magnetic valves which are of no particular significance in the present invention and, hence, have not been illustrated. The magnetic valves receive their electrical signals from an electronic unit 3 which is arranged on one side 4 of the housing member 2. A trough-shaped cover 5 extends over the electronic unit 3 and shields it against the environment. The cover 5 bears with a plane abutment surface 6 against the side 4 of the housing body 2. Sealing means (not shown in the FIGURE) may be provided between the side 4 and the abutment surface 6 for achieving an improved sealing effect.

On another side 7 of the housing body 2, there is an electric motor which drives a hydraulic pump in the inside of the housing body 2 and furnishes the automotive vehicle brake system with the necessary pressure and volume flow of the pressure fluid. The electric motor includes a rotor 8 which is mounted on a motor shaft (not shown). Permanent magnets 11 which cooperate with the rotor 8 are fastened to the inner wall 10 of a generally bowl-shaped motor housing 9. For abutment with the housing body 2, the motor housing 9 has a flange 12 which bears against the side 7 either directly, as is shown in FIG. 1, or indirectly by the intermediary of a sealing means. The flange 12 and the housing body 2 include through-bores 13, 14 which are in alignment with each other, and the attachment means 15 grips through the two throughbores 13, 14 and extends from the flange side of the motor housing 9 until the cover 5. According to the preferred embodiment shown, the attachment means 15 is a screw and has a head 16 making catch at the flange 12. A stem 17 of the screw extends through the two throughbores 13, 14 and engages with a threaded portion 18 into the cover 5. As attachment means 15, for example, reduced-shaft bolts can be used which have the advantage that only a small loss in preloading force occurs after the assembly in the course of time. The attachment means 15 fastens the cover 5 and the motor housing 9 to the housing body 2 in such a manner that the two components bear against the housing body 2 under preload and with the same contact force. Thus, the attachment of the two structural elements is effected with a joint attachment means 15 which clamps the two structural elements in relation to each other and is pressed against the centrally arranged housing body 2. Because separate attachment means are provided for each structural element in motor-driven units according to the state of the art, material is economized due to the arrangement of joint attachment means 15 by the present invention. The assembly effort is reduced in addition because a smaller number of attachment means 15, for example, screws, is required and the screws can be inserted exclusively from one assembly side. Finally, it is of major importance that the sealing effect is rendered more uniform because both the cover 5 and the motor housing 9 are pressed against the housing body 2 with the same force.

Principally, an attachment means 15 in the type of a screw can be screwed directly into the cover 5. The FIGURE shows a preferred embodiment where the cover 5 is made of plastic and, additionally, a bushing 19 with a thread is formed into the cover. The attachment means 15 with a threaded portion 18 is engaged into the thread of the bushing 19. This preferred embodiment is especially appropriate for great contact forces with a correspondingly high amount of screw preloading force. For example, the bushing is made of metal. The bushing 19 includes a portion 20 which is locked against rotation. The portion 20 has a toothing or a polygonal shape which counteracts rotation in a form-locking manner.

The motor-driven unit 1 may include a plurality of attachment means 15 which, in regular intervals, are arranged eccentrically in the area of the flange 12 of the motor housing 9. For a reliable and fluid-tight attachment, however, already one single attachment means is sufficient which is disposed in alignment with an axis of symmetry between the motor housing 9 and the cover 5. Thus, the attachment means quasi forms the axis of symmetry of the motor shaft.

What is claimed is:

1. Motor-driven unit for an automotive vehicle brake system, comprising:

a cover, a motor housing, a housing body directly contacting the cover and the motor housing, and at least one attachment means for attaching the cover and the motor housing such that the cover and the motor housing bear against the housing body with the same contact force.

2. Motor-driven unit as claimed in claim 1, wherein the attachment means extends through the housing body.

3. Motor-driven unit as claimed in claim 2, wherein said attachment means comprises a reduced-shaft bolt.

4. Motor-driven unit as claimed in claim 1, wherein the cover is made of plastic and includes a bushing for engaging the attachment means.

5. Motor-driven unit for an automotive vehicle brake system, comprising:

a cover, a motor housing, a housing body directly contacting the cover and the motor housing, and at least one screw for fastening the cover and the motor housing to the housing body such that the cover and the motor housing are pressed against the housing body with the same force.

6. Motor-driven unit as claimed in claim 5, wherein the cover includes a bushing for engaging the screw when the screw is fastening the cover and the motor housing.

7. Motor-driven unit as claimed in claim 5, wherein the bushing includes a portion to prevent rotation of the bushing as the screw is fastening the cover and the motor housing.

8. Motor-driven unit as claimed in claim 5, wherein the motor housing and the housing body both include a throughbore for allowing the screw to fasten the cover and the motor housing.

9. Motor-driven unit for an automotive vehicle brake system, comprising:

a cover including a bushing, a motor housing including a throughbore, a housing body directly contacting the cover and the motor housing, the housing body including a throughbore, and at least one bolt passing through both the throughbore of the motor housing and the throughbore of the housing body such that the at least one bolt can be threaded into the bushing in the cover to press the cover and the motor housing against the housing body with the same force, thereby evenly sealing the housing body.

* * * * *